United States Patent
Redpath

(10) Patent No.: US 6,993,472 B2
(45) Date of Patent: Jan. 31, 2006

(54) METHOD, APPARATUS, AND PROGRAM FOR CHAINING MACHINE TRANSLATION ENGINES TO CONTROL ERROR PROPAGATION

(75) Inventor: Richard J. Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 09/919,235

(22) Filed: Jul. 31, 2001

(65) Prior Publication Data

US 2003/0028366 A1 Feb. 6, 2003

(51) Int. Cl.
*G06F 17/28* (2006.01)
(52) U.S. Cl. .................................... 704/2; 8/9
(58) Field of Classification Search ............... 704/2–7, 704/8, 9
See application file for complete search history.

(56) References Cited

U.S. PATENT DOCUMENTS

| | | | | |
|---|---|---|---|---|
| 5,490,061 A | * | 2/1996 | Tolin et al. | 704/2 |
| 5,873,055 A | * | 2/1999 | Okunishi | 704/2 |
| 6,163,785 A | * | 12/2000 | Carbonell et al. | 715/530 |
| 6,275,789 B1 | * | 8/2001 | Moser et al. | 704/7 |
| 6,470,306 B1 | * | 10/2002 | Pringle et al. | 704/3 |

* cited by examiner

*Primary Examiner*—Richemond Dorvil
*Assistant Examiner*—Lamont Spooner
(74) *Attorney, Agent, or Firm*—Duke W. Yee; A. Bruce Clay; Stephen R. Tkacs

(57) ABSTRACT

A mechanism is provided for chaining machine translation engines using linguistic annotation language in the intermediate language. A first machine translation engine is provided that translates the source language text into an intermediate language text marked up with linguistic annotation language. A second machine translation engine translates the intermediate language text into the target language using the linguistic annotation language.

2 Claims, 3 Drawing Sheets

METHOD, APPARATUS, AND PROGRAM FOR CHAINING MACHINE TRANSLATION ENGINES TO CONTROL ERROR PROPAGATION

RELATED APPLICATIONS

The present application is related to commonly assigned and co-pending U.S. patent application Ser. No. 09/919,257 entitled "METHOD, APPARATUS, AND PROGRAM FOR CHAINING SERVER APPLICATIONS," filed on even date herewith, and hereby incorporated by reference.

BACKGROUND OF THE INVENTION

1. Field of the Invention

The present invention relates to data processing systems and, in particular, to machine translation. Still more particularly, the present invention provides a method, apparatus, and program for chaining machine translation engines to control error propagation.

2. Background of the Invention

Machine translation (MT) is a computer technology wherein a computer software program or computer hardware translates a textual source human language into some textual target human language. An example is translation from English to German. Machine translation services are provided for many pairs of languages. Typically, a language pair supplier may develop language pair engines that can provide translation for common language pairs. However, to provide a machine translation for every possible combination of source language and target language would require an extremely large amount of time and code. Thus, it is unrealistic to provide a language pair for every possible combination, especially considering that demand for most pairs may be very low or nonexistent.

Machine translation may be provided for some pairs by chaining pairs together. For example, translation from German to French may be provided by chaining a German-to-English translation with an English-to-French translation. However, each translation engine may have a degree of inaccuracy or error. By increasing the number of translation engines in a translation, the likelihood of inaccuracy or error is also increased.

Therefore, it would be advantageous to provide an improved mechanism for chaining machine translation engines to control error propagation.

SUMMARY OF THE INVENTION

The present invention provides a mechanism for chaining machine translation engines using linguistic annotation language in the intermediate language. A first machine translation engine is provided that translates the source language text into an intermediate language text marked up with linguistic annotation language. A second machine translation engine translates the intermediate language text into the target language using the linguistic annotation language.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
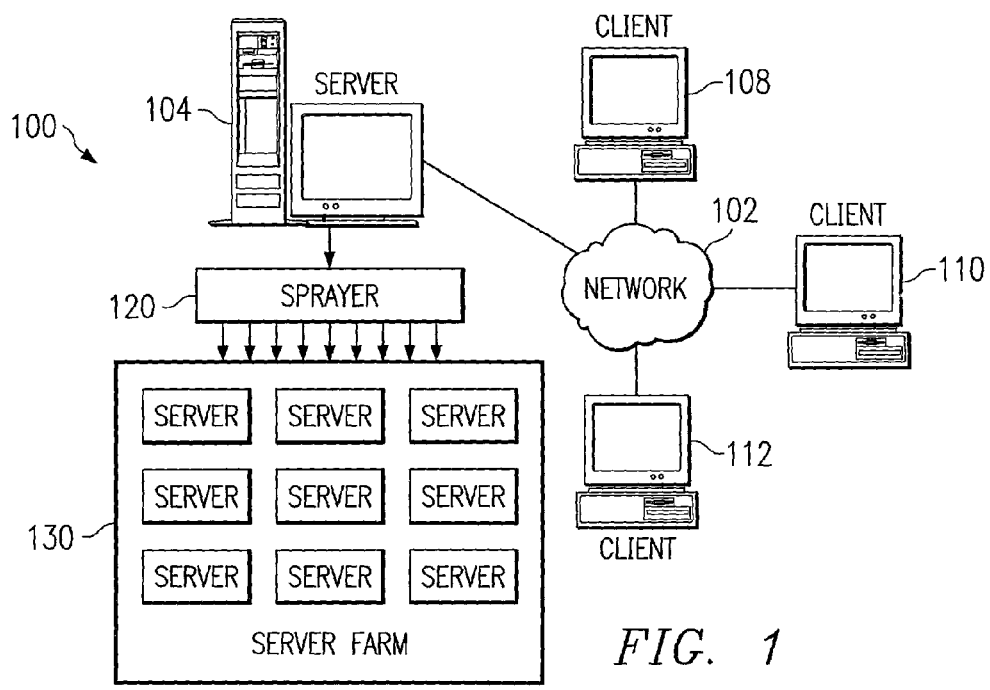
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102. In addition, clients 108, 110, and 112 are connected to network 102. These clients 108, 110, and 112 may be, for example, personal computers or network computers. In the depicted example, server 104 provides data, such as documents, to clients 108–112. In a specific example, server 104 may be a Web server. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

To provide service on a scalable range server farm 130 may be used. Server 104 may direct requests from clients to one of the servers in server farm 130 through sprayer 120. The sprayer distributes requests to one of the servers in the server farm and may perform other functions, such as load balancing. Each server in the server farm may run all the available applications. For example, each server may run a German-to-English translation, an English-to-Spanish translation, and a verification application for verifying whether the requesting client is authorized to access each application.

Figure 2:
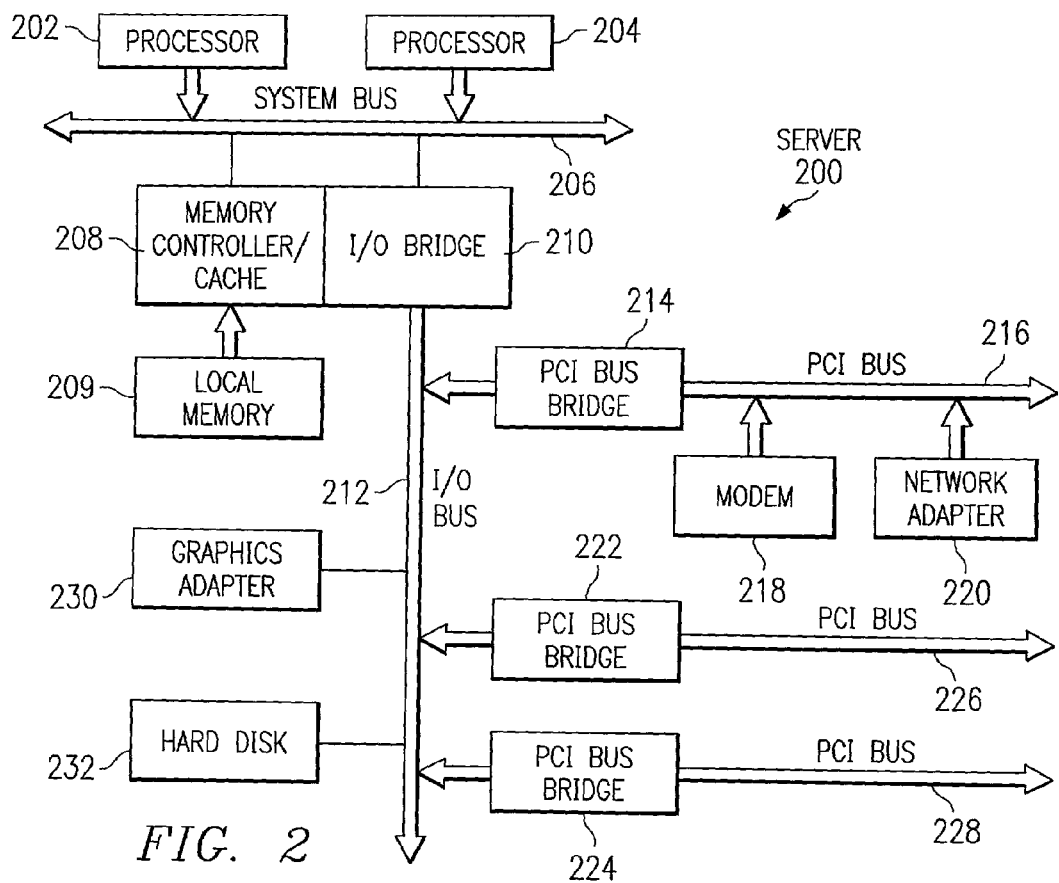
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
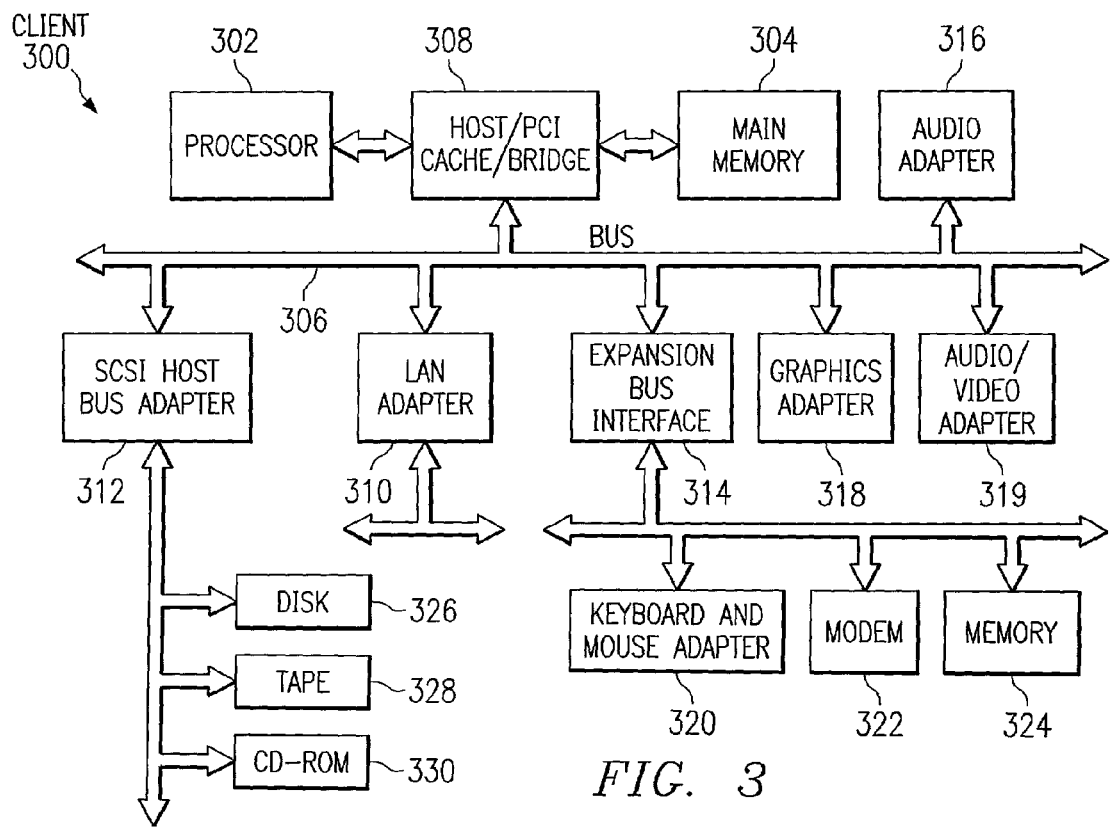
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
FIG. 4 depicts an example translation in accordance with a preferred embodiment of the present invention.

With reference now to FIG. 4, an example translation is shown in accordance with a preferred embodiment of the present invention. Machine translation engine 410 receives source language text as input and translates the text into a second language, which serves as an intermediate language. The intermediate is not an invented language, such as Esperanto, but an actual natural language or "spoken" language. Machine translation engine 420 receives the intermediate language text as input and translate the text into the target language.

Each translation engine may have a degree of inaccuracy or error. By increasing the number of translation engines in a translation, the likelihood of inaccuracy or error is also increased. Furthermore, any error in machine translation engine 410 may be propagated through machine translation engine 420. Therefore, the quality of translation in the example shown in FIG. 4 will typically be less than that for a machine translation engine written to directly translate the source language text into a target language.

However, the cost of developing a machine translation engine for a particular source language and target language may not be justified by the demand. For example, translation from German (Deutsche) to English and translation from English to Portuguese may be common, while translation from German to Portuguese may be very rare. In this example, the demand for German to Portuguese translation may not justify the cost of developing a specific machine translation engine for that language pair. In fact, even if the demand justifies the demand, machine translation engines may be chained together while a specific machine translation engine for the particular language pair is developed. Thus, the chaining method of FIG. 4 may be preferred for certain cases.

In accordance with a preferred embodiment of the present invention, the machine translation engines may be expanded to use linguistic annotation language (LAL) to control error propagation. LAL is a markup language that is used to mark up source documents that are to be translated. For example, the English clause "he is standing near the bank" may be annotated as "he is standing near the <subject=geology>bank</subject>." From the annotation a subsequent machine translation engine will know that the word "bank" refers to a river and not a financial institution.

In the example shown in FIG. 4, machine translation engine 410 may translate the source language text into the intermediate language and mark up the output with LAL. Again, the intermediate is not an invented language, but an actual natural language that has been annotated to help translate it better. Machine translation engine 420 may then receive the intermediate text as input and use the LAL to more accurately translate the text into the source language.

Figure 5:
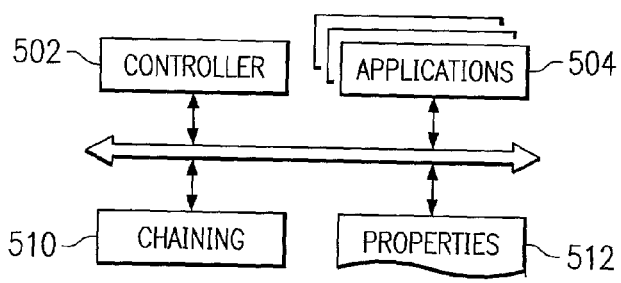
FIG. 5 is a block diagram illustrating the functional components of a server in accordance with a preferred embodiment of the present invention.

With reference to FIG. 5, a block diagram illustrating the functional components of a server is shown in accordance with a preferred embodiment of the present invention. The server includes a controller 502 and applications 504. The controller controls the execution of applications 504. Applications 504 may provide services, such as machine translation, that are provided by the server. Applications may be used in conjunction with one another. For example, one application may provide a machine translation service that translates text from a source language to a target language. Another application may provide a statistics service that counts the number of words in the target language text.

The server also includes chaining module 510. The chaining module allows applications to be used together without requiring specific code for passing the output of one application to the input of the next application in the chain. For example, to call a German (Deutsche (de)) to English translation engine (deen) chained with an English to French translation engine (enfr), a client may simply call the chain module to chain deen and enfr.

The server may also include properties 512. Each of applications 504 and the chaining module 510 are registered in the properties file by establishing a name and associating an application to the name. A provider may also register a chain of applications in properties 512 by establishing a name and associating the chain module to that name setting the chain of applications to be chained using a chain option recognized by the chain module. Properties 512 may be embodied as a file stored on the server.

The functional components illustrated in FIG. 5 may be embodied in hardware, software, or a combination of hardware and software. For example, controller 502 may be a processor, such as processors 202, 204 in FIG. 2, and applications 504 and chaining module 510 may be software executing on the processor. The functional components of the server may also be implemented as firmware.

Figure 6:
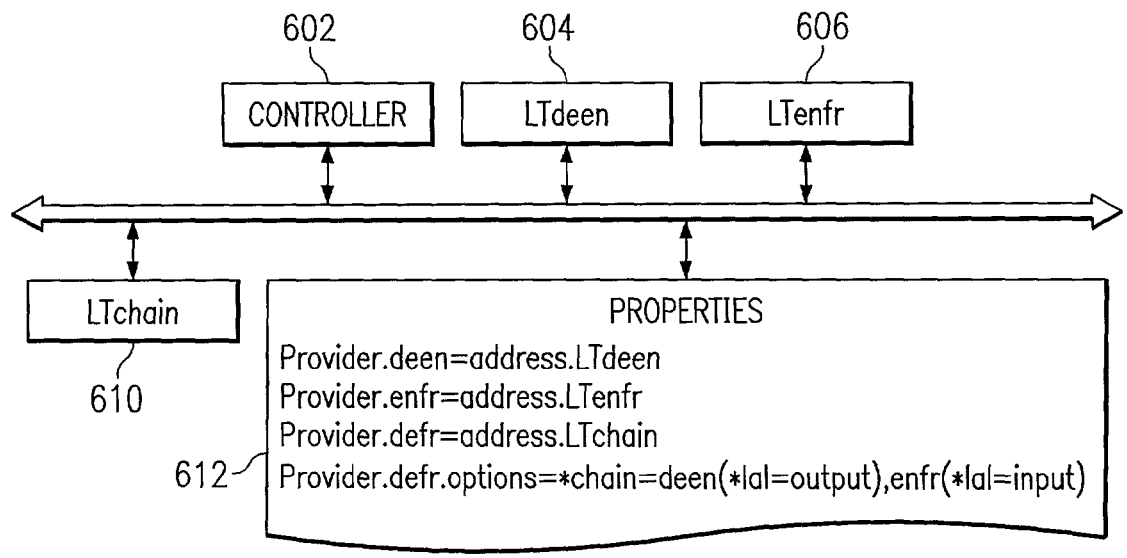
FIG. 6 illustrates the functional components of a specific example of a server in accordance with a preferred embodiment of the present invention.

Next, FIG. 6 illustrates the functional components of a specific example of a server in accordance with a preferred embodiment of the present invention. The server includes a controller 602, language translation engine LTdeen 604, and language translation engine LTenfr 606. LTdeen provides a machine translation service that translates text from German (Deutsche (de)) to English (en). LTenfr provides a machine translation service that translates text from English to French (fr).

The server also includes chaining module 610. The chaining module allows applications to be used together without requiring specific code for passing the output of one application to the input of the next application in the chain. The server also includes properties 612. LTdeen 604 is registered in the properties file by establishing a name and associating an application to the name. The property keyword "provider" is concatenated with the service insignia to form the name. The text "Provider.deen=address.LTdeen" is used to register the LTdeen application. LTenfr 606 is registered using the text "Provider.enfr=address.LTenfr."

A new service may be registered by establishing a name and associating the chaining module to the name in properties 612. For example, a German to French translation engine may be registered using the text "Provider.defr=address.LTchain" and setting the chaining options using the text "Provider.defr.options=*chain=deen,enfr." The defr translation service may also be registered to automatically use LAL by setting an LAL option for each translation application in the chain. for example, as seen in FIG. 6, the deen language translation service uses the option "*lal=output" and the enfr language translation service uses the option "*lal=input."

Thus, machine translation applications may be set up to automatically use LAL to control error propagation. FIG. 6 shows an example in which machine translation services are configured automatically; however, other configurations of language translation engines that mark up the intermediate language text with LAL may be used within the scope of the present invention.

Figure 7:
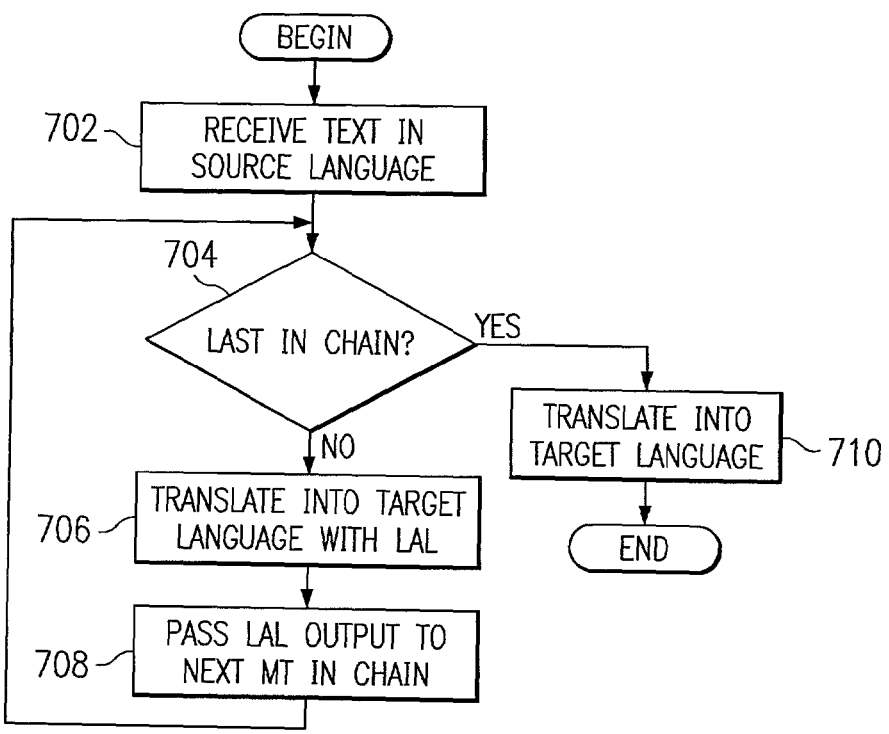
FIG. 7 is a flowchart illustrating the operation of a chain of machine translation engines in accordance with a preferred embodiment of the present invention.

With reference now to FIG. 7, a flowchart illustrating the operation of a chain of machine translation engines is shown in accordance with a preferred embodiment of the present invention. The process begins and receives text in a source language (step 702). A determination is made as to whether a current translation engine is the last machine translation in the chain (step 704). If the current machine translation engine is not the last in the chain, the process translates the text into the target language of the engine and marks up the target language text with LAL (step 706). Next, the process passes the LAL output to the next machine translation engine in the chain (step 708).

Then, the process returns to step 704 to determine whether the current translation engine is the last machine translation in the chain. If the current machine translation engine is the last in the chain in step 704, the process translates the text into the target language without LAL output (step 710) and ends.

Thus, the present invention solves the disadvantages of the prior art by providing a mechanism for chaining machine translation engines using linguistic annotation language in the intermediate language. A first machine translation engine is provided that translates the source language text into an intermediate language text marked up with linguistic annotation language. A second machine translation engine translates the intermediate language text into the target language using the linguistic annotation language. The use of LAL helps to avoid ambiguities in translation and to control the error propagation between language translation engines.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a server computer, for chaining applications, comprising:

receiving, at a chaining module, a request from a requesting application for a service and an option associated with the chaining module, wherein the option identifies the service by a service name and wherein the option specifies use of a linguistic annotation language;

receiving a properties file, wherein the properties file associates the service name with a series of applications;

receiving the series of applications corresponding to the chaining module, wherein the series of applications comprises a first translation engine and a second translation engine, wherein the first translation engine translates from a source natural language to an intermediate natural language, and wherein the second translation engine translates from the intermediate natural language to a target natural language;

executing the first translation engine and the second translation engine in order and passing the output of the first translation engine to the input of the second translation engine, wherein the output of the first translation engine is annotated with the linguistic annotation language and wherein the linguistic annotation language is a markup language; and returning a result of the service to the requesting application.

2. A computer program product, in a computer readable medium, for chaining applications, comprising:

instructions for receiving, at a chaining module, a request from a requesting application for a service and an option associated with the chaining module, wherein the option identifies the service by a service name and wherein the option specifies use of a linguistic annotation language;

instructions for receiving a properties file, wherein the properties file associates the service name with a series of applications;

instructions for receiving the series of applications corresponding to the chaining module, wherein the series of applications comprises a first translation engine and a second translation engine wherein the first translation engine translates from a source natural language to an intermediate natural language, and wherein the second translation engine translates from the intermediate natural language to a target natural language;

instructions for executing the first translation engine and the second translation engine in order and passing the output of the first translation engine to the input of the second translation engine, wherein the output of the first translation engine is annotated with the linguistic annotation language and wherein the linguistic annotation language is a markup language; and instructions for returning a result of the service to the requesting application.

* * * * *